United States Patent [19]

Carson

[11] 4,428,203
[45] Jan. 31, 1984

[54] POWER GENERATION USING FRACTIONATION COLUMN REBOILER SYSTEMS

[75] Inventor: Don B. Carson, Mt. Prospect, Ill.
[73] Assignee: UOP Inc., Des Plaines, Ill.
[21] Appl. No.: 394,373
[22] Filed: Jul. 1, 1982
[51] Int. Cl.$^3$ ............................................. F01K 17/00
[52] U.S. Cl. ...................................... 60/648; 60/676; 203/DIG. 20; 208/365
[58] Field of Search ................ 60/648, 651, 671, 676; 203/DIG. 20, 27; 208/353, 365

[56] References Cited

U.S. PATENT DOCUMENTS

| | | | |
|---|---|---|---|
| 3,032,482 | 5/1962 | Shoemaker | 203/DIG. 20 |
| 3,476,653 | 11/1969 | Doland | 60/648 X |
| 4,087,354 | 5/1978 | Hessler | 208/251 R |
| 4,109,469 | 8/1978 | Carson | 60/676 |
| 4,129,606 | 12/1978 | Gewartowski | 260/674 R |

Primary Examiner—Allen M. Ostrager
Assistant Examiner—Stephen F. Husar
Attorney, Agent, or Firm—James R. Hoatson, Jr.; John F. Spears, Jr.; William H. Page, II

[57] ABSTRACT

A process is disclosed for generating steam or electrical power from surplus heat transferred to the total bottoms liquid of a fractionation column. Preferably the reboiler of the column is supplied with more fuel than required in the operation of the column. A portion of the total bottoms liquid stream in excess of the net bottoms stream is diverted from the bottoms liquid destined for the reboiler. This diverted stream is used to vaporize a working fluid and this vapor is removed as a product or passed into the turbine of an electrical generator. The excess bottoms liquid is then split off and passed into the reboiler. The remainder of the bottoms liquid is the net bottoms stream and is used to preheat the working fluid. The process has the advantage of an exceptionally high thermal efficiency in terms of converting the surplus heat released in the reboiler into electricity.

12 Claims, 1 Drawing Figure

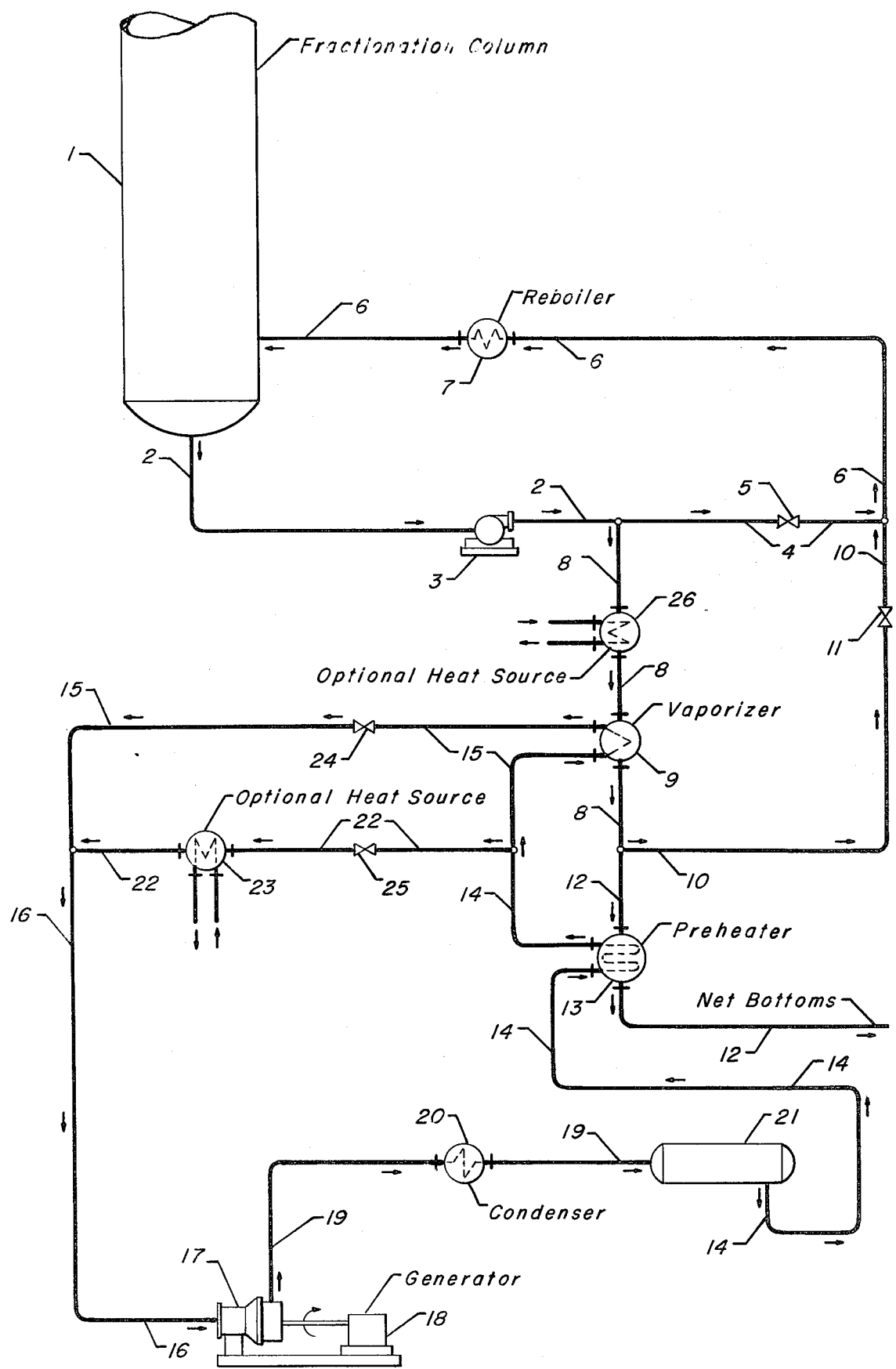

POWER GENERATION USING FRACTIONATION COLUMN REBOILER SYSTEMS

FIELD OF THE INVENTION

The invention relates to a process for vaporizing a working fluid by the indirect heat exchange of the working fluid against the bottoms liquid stream of a fractionation column of the type often employed in petroleum refineries or petrochemical complexes for the separation of chemical compounds by fractional distillation. The invention more directly relates to the production of electricity through the use of a turbine which is driven by a vaporized working fluid which was heated and vaporized by indirect heat exchange against a liquid stream removed from the bottom of a fractionation column. The invention is specifically directed to a high efficiency process for generating electricity by the combustion of excess fuel in a fractionation column reboiler beyond that required for the operation of the fractionation column.

PRIOR ART

Fractionation columns are employed in essentially all petroleum refineries and petrochemical complexes to separate volatile chemical compounds by fractional distillation. Heat is supplied to the bottom of the fractionation column to produce vapors which rise through the column through the use of an indirect heat exchange means which is referred to as a reboiler. The reboiler may be stabbed into the bottom of the fractionation column proper but is more typically located outside of the column. A liquid stream referred to as the bottoms liquid stream is withdrawn from a lower portion of the fractionation column and divided into a first portion which is removed from the process as a product stream referred to as the net bottoms stream and a second portion which is passed into the reboiler for partial vaporization. The portion of the bottoms liquid stream entering the reboiler is then returned to the bottom portion of the fractionation column.

The net bottoms stream of the fractionation column has a temperature approximately equal to that maintained in the bottom of the fractionation column and may therefore be at a rather elevated temperature. Those skilled in the art of petroleum refinery process design have recognized the economic potential of recovering a portion of this heat. This is especially true when the net bottoms stream is destined for storage or other low temperature situations and it is necessary to cool the net bottoms stream before it is withdrawn from the process. It is therefore a fairly common practice to recover useful heat from the net bottoms stream of a fractionation column by the indirect heat exchange of the net bottoms stream against a process stream which it is desired to heat. One example of this is the indirect heat exchange of the net bottoms stream against the feed stream to the fractionation column as shown in U.S. Pat. Nos. 4,087,354 and 4,129,606. Another common practice is to utilize heat available in streams such as the net bottoms stream of a column to generate moderate or low pressure steam which may be used elsewhere in the industrial complex.

U.S. Pat. No. 4,109,469 is directed to a process for power generation from petroleum refinery waste heat streams. A waste heat stream is a process stream which is at an elevated temperature which is normally considered too low to allow the commercially economical recovery of significant quantities of usable heat within the process. That is, although this stream is at an above ambient temperature, it is not hot enough to serve as a useful heating medium within the process or to generate steam having a useful pressure. This reference is pertinent for its showing that a working fluid may be vaporized using heat available in a petroleum refinery and the working fluid vapor stream may then be depressurized through a turbine to generate electricity.

BRIEF SUMMARY OF THE INVENTION

The subject invention provides a very highly efficient process for the vaporization of a working fluid which may then be used to generate electrical power by the depressurization of the vaporized working fluid in a turbine. The subject process has the advantage of being able to generate electricity at a higher efficiency, in terms of required BTU/kilowatt, due to the fact that essentially all of the incremental energy supplied to the process for the purpose of generating electricity is utilized to vaporize the working fluid rather than both heating and vaporizing the working fluid. A second advantage of the subject process is that it requires a minimal amount of additional process equipment. It is to be noted that the subject process is specifically directed to the generation of additional amounts of electrical power or vaporized fluid above that which it is normally generated, through the conversion of an increased amount of energy which is supplied to the reboiling system of the fractionation column. The preferred manner in which this is accomplished is by an increase in the amount of fuel supplied to a direct fired reboiler of the fractionation column above that required for operation of the fractionation column. The subject invention utilizes the heat released from the combustion of this excess fuel to vaporize an additional amount of the working fluid in a vaporizer, with the total amount of sensible heat required to increase the temperature of the working fluid preferably being supplied by the net bottoms stream in a second heat exchanger referred to as the preheater.

One embodiment of the subject process may be characterized as comprising the steps of dividing a bottoms liquid stream withdrawn from a fractionation column into a first portion and a second portion; cooling the second portion of the bottoms stream by passage through a vaporizer or first indirect heat exchange means wherein a working fluid is vaporized; dividing the second portion of the bottoms stream into a third portion and a fourth portion; returning the first and the third portions of the bottoms stream to the fractionation column via passage through a reboiler means operatively associated with the fractionation column; cooling the fourth portion of the bottoms stream by passage through a working fluid preheater or second indirect heat exchange means wherein the working fluid is heated; withdrawing the fourth portion of the bottoms stream from the process as the net bottoms stream of the fractionation column and depressurizing the vapor phase working fluid produced in the vaporizer in a turbine and thereby recovering useful energy from the vapor phase working fluid.

DESCRIPTION OF THE DRAWING

The Drawing illustrates the preferred embodiment of the process as well as two alternative embodiments of the process. This depiction of several embodiments of the invention is not intended to preclude from the scope of the subject invention those other embodiments set out herein or which are the result of normal and expected variation to the subject process by those skilled in the art. The Drawing has been simplified by the deletion of many minor accouterments which are normally present in a process such as this including pressure, temperature and flow monitoring and control systems, fractionation trays, pumps, etc.

Referring now to the Drawing, a total bottoms liquid stream is removed from the fractionation column 1 through line 2 and is pressurized in a pump 3. The total bottoms liquid stream of the column is then divided into a first or recycle portion passed through line 4 and a smaller second portion which is passed through line 8. The portion of the bottoms liquid stream flowing through line 8 is cooled in a first indirect heat exchange means 9 referred to herein as a vaporizer. This portion of the bottoms liquid stream is then further subdivided into a portion flowing through line 10 and a portion flowing through line 12. The portion of the bottoms liquid stream flowing through line 10 is combined with the bottoms liquid stream material from line 4 and passed into the reboiler 7 through line 6. A portion of the liquid entering the reboiler is therein vaporized and these vapors or a mixture of vapor and liquid is returned to the bottom of the fractionation column. The portion of the bottoms liquid stream flowing through line 12 is further cooled in a second indirect heat exchange means 13 referred to as a preheater and is then removed from the process as the net bottoms stream of the fractionation column. An additional cooler not shown is usually present in line 12 downstream of the preheater to cool the net bottoms stream by indirect heat exchange against air or cooling water. The flow rate of the two streams of bottoms liquid carried by lines 4 and 10 may be controlled through the operation of one or both of flow control valves 5 and 11.

A working fluid, which is preferably isobutane, is continuously circulated in a closed loop comprising the preheater 13, the vaporizer 9, the turbine 17 and a condenser 20. A liquid phase stream of the working fluid is removed from a surge tank 21 through line 14 and pressurized by a pump not shown on the Drawing. This liquid phase stream of the working fluid is heated in the preheater 13 to a temperature which is preferably very close to or equal to the temperature at which it is subsequently vaporized. The thus-heated liquid phase working fluid stream continues through line 15 and is vaporized in the vaporizer 9. The vapor phase working fluid stream leaves the vaporizer through line 15 and is passed through line 16 into a turbine 17 wherein it is depressurized. The energy released by depressurizing the working fluid vapor is transferred to an electrical generator 18 which produces electricity which is withdrawn from the process. The depressurized working fluid vapors are carried through a condenser 20 by line 19 and are therein converted to a liquid phase working fluid which is returned to the surge vessel 21.

The two optional embodiments illustrated in the Drawing relate to the manner in which outside secondary heat sources may be integrated into the process. In one of these variations, an optional heat source 26, which comprises an indirect heat exchange means receiving a suitable hot fluid, is used to heat the portion of the bottoms liquid stream flowing through line 8. This provides more heat in this portion of the bottoms liquid stream which is then available for vaporizing an additional portion of the working fluid in the vaporizer 9. In the second variation or embodiment of the invention, a portion of the heated working fluid liquid flowing through line 14 is diverted into line 22. The flow rate of the working fluid through line 22 may be controlled through the proper operation of one or both of flow control valves 24 and 25. In this second embodiment, the optional secondary heat source is utilized within a second vaporizer which comprises an indirect heat exchanger means 23. The working fluid stream entering the heat exchanger 23 is thereby vaporized to form high pressure vapor phase working fluid which is depressurized in the turbine as described above.

DETAILED DESCRIPTION

A very large amount of energy is consumed in petroleum refineries and petrochemical plants due to the high temperatures and pressures which are involved in a great many of the processes performed in these industrial facilities. For instance, the normal large scale refinery consumes from about 4% to about 8% by volume of its crude oil charge stock to provide its own internal heat requirements. Those skilled in the art have therefore made a long and continuing effort to economize the operation of such facilities by reducing the amount of energy which is required to operate the process and by recovering any available useful energy in economically practical manners. One of the many available heat sources present in a petroleum refinery or petrochemical complex is the net bottoms liquid stream of a fractionation column. This stream will normally have a temperature equal to the bottoms temperature of the fractionation column and must often be cooled to near ambient temperatures when it is withdrawn from the process as a product stream. Therefore, as previously described, it is a common practice to utilize the available heat present in the net bottoms stream of the fractionation column to heat another process stream or to generate low or moderate pressure steam.

The conventional method of generating steam for the purpose of producing electrical energy is a two-step operation. The water which is to be vaporized is first heated in an apparatus referred to as a preheater. It is preferred that substantially no vaporization of the working fluid occurs in the preheater, a term used herein to indicate that less than 5 mole percent of the working fluid is vaporized within the preheater. The function of the preheater therefore is to raise the temperature of the liquid phase working fluid to the temperature at which it is to be passed into a downstream apparatus referred to as a vaporizer. The vaporizer may be characterized in that the very great majority, that is an excess of 60–75%, of the energy fed to the vaporizer is utilized to vaporize the working fluid and is therefore absorbed by the working fluid as latent heat rather than the sensible heat which is transferred to the working fluid in the preheater. The subject process employs a similar preheater-vaporizer arrangement.

The highest efficiency which is theoretically possible to obtain in a power cycle such as described herein is limited by the absolute temperature difference of the high temperature heat source and the heat sink. The actual thermal efficiency of any power generating process is always well below the theoretical efficiency due to a large number of factors. These efficiency-reducing factors include heat losses from the system, frictional losses in the fluid transfer system, pumps and turbine required in the system, and perhaps more significantly the inability to utilize all of the available heat present in the heat source. The efficiency of a power generating process may be measured in terms of the number of BTU's which are required to generate a kilowatt or kilowatt-hour of electrical energy. The more energy in terms of BTU which are required to generate the same amount of electrical energy, the lower the efficiency becomes.

In a standard power generation facility such as a commercial electrical power plant of a public utility, a very sizable amount of energy is consumed in the preheater for the purpose of warming the working fluid from the temperature at which it leaves the condenser to the temperature at which it is fed to the vaporizer. In such a typical utility power plant, the steam (working fluid) is depressurized through a number of successive stages, with each stage delivering power to an electrical generator. Portions of the exhaust steam of various turbine stages are removed from the main stream for use in preheating the working fluid. This diverted interstage exhaust steam does not flow through subsequent turbine stages, and hence produces no electrical power. As the normal electric utility power plant has no alternative source of heat available to provide the required preheating of the working fluid, this procedure is from a thermodynamic viewpoint as well as can be done in this situation.

The efficiency of an electrical power generation process as described above may be increased by reducing the amount of sensible heat which the process requires or by decreasing the ratio of the required sensible heat to the heat transferred to the working fluid as latent heat within the process. The efficiency of power generation using a high temperature fluid stream such as the bottoms stream of a fractionation column as a heat source may therefore be increased by increasing the percentage of the total available heat in the high temperature fluid stream which is used to vaporize the working fluid.

In the subject process the efficiency of an incremental amount of heat added to the process is substantially higher than is obtained in a conventional preheater-vaporizer system such as is employed in a public utility. It must be noted that this increased efficiency is obtained only with the incremental amount of heat which is added to the bottoms system of the fractionation column as part of the process. To convert this incremental amount of available energy into power produced by the subject process, the amount of the hot bottoms liquid stream which flows through the vaporizer is increased. That is, in comparison to the prior processes in which only the net bottoms stream of the fractionation column passes through the vaporizer, in the subject process both the net bottoms stream of the column and an additional portion of the bottoms liquid of the column are passed through the vaporizer. This results in the additional portion of the bottoms liquid being cooled and it is therefore necessary to reheat this bottoms liquid to the temperature at which it is withdrawn from the fractionation column in order to continue the proper operation of the fractionation column. It is therefore necessary to in turn increase the amount of fluid or high temperture heat transfer fluid which is passed into the reboiler of the fractionation column for the purpose of adding heat to the bottoms system of the column. The subject process is therefore a method of vaporizing a working fluid or generating electrical power by supplying to the reboiler system of a fractionation column an incremental amount of energy which is in excess of the amount of heat required or desired for the operation of the column.

The process achieves an exceptionally high efficiency in converting this additional amount of added heat to useful rotational energy because substantially all of the added heat is utilized in the vaporizer. The additional heat therefore is, to a very high extent, transformed into usable vaporized working fluid. This is possible because the remaining heat present in the net bottoms stream is normally sufficient to operate the preheater in an effective manner even for the increased flow of the working fluid which is possible with the subject process. In this regard it should be pointed out that the flow of the working fluid through the preheater and vaporizer is preferably increased rather than the temperature of the vaporized working fluid which leaves the vaporizer. The high thermal efficiency of the process may therefore be said to result from the process receiving or utilizing the sensible heat required for the additional working fluid flow at a very low cost or for "free" in comparison to the prior art processes.

It is highly preferred that the subject process is utilized in conjunction with the reboiling system of a fractionation column although this application of the inventive concept is not required. As used herein, the terms "bottoms liquid stream" or "total bottoms liquid stream" are intended to indicate the total flow of liquid material which is removed from the bottom or lower portion of a fractionation column. This is the stream which flows through line 2 of the Drawing. The term "net bottoms stream" is intended to indicate the much smaller product stream which is withdrawn from the fractionation process as a product stream and is equivalent to the stream carried by line 12 of the Drawing. The total bottoms liquid stream therefore comprises both the net bottoms stream and the additional amount of bottoms liquid which is recirculated through reboiler means for purposes of supplying heat and vapor to the bottom of the fractionation column.

These is no inherent limitation on the chemical composition of the working fluid and essentially any chemical compound which satisfies the various requirements of an acceptable working fluid for such a thermodynamic process, such as the appropriate boiling point at a desired range of working temperatures, thermal stability, non-corrosiveness, and low cost may be employed within the process. The preferred working fluid therefore depends on the temperature of the heat to be recovered in the vaporizer. Suitable working fluids include water and hydrocarbons, with light hydrocarbons containing from about 2 to about 7 carbon atoms per molecule being preferred. The hydrocarbons may be paraffins, olefins, various cyclic compounds including benzene, and toluene, ethane, propane, isobutane, normal butane, butylene, propylene, and the various amylenes. Isobutane is preferred in many cases. A mixture of hydrocarbons such as a mixture of propane and butane could also be used as working fluid. Halogenated hydrocarbons containing fluorene and/or chlorine may also be employed in the subject process. Exemplary halogenated hydrocarbons are trichloromonofluoromethane, dichlorodifluoromethane, tetrafluoromethane, dichlorotetrafluoroethane and octafluorocyclobutane.

The subject invention has to this point been addressed mainly from the viewpoint of being a process for generating electrical energy. However the generation of electrical energy is just one of the several possible uses for the high pressure vaporized working fluid which may be produced according to the subject invention. The turbine could be connected to a pump, compressor or other piece of rotating equipment instead of being connected to an electrical generator. Further, the vaporized working fluid could in itself be characterized as a useful final product of the subject process and could be used for heating purposes or passed into a process vessel as a reactant or diluent. One embodiment of the subject process may accordingly be broadly characterized as a process for vaporizing a working fluid which comprises the steps of heating a liquid phase stream of the working fluid in a first indirect heat exchange means wherein less than 5 mole percent of the working fluid is vaporized by indirect heat exchange against the net bottoms stream of a fractionation column; vaporizing at least a portion of the working fluid stream in a second indirect heat exchange means by indirect heat exchange against a high temperature first process stream comprising the net bottoms stream of the fractionation column and an additional amount of the total bottoms stream of the fractionation column and thereby forming a low temperature second process stream; and passing a portion of the second process stream into the fractionation column. This low temperature process stream is preferably returned to the fractionation column via a reboiler operatively associated with the fractionation column, but this stream could be returned to the fractionation column directly without passage through the reboiler by being charged to an intermediate point of the fractionation column to supply liquid to the column or as part of a feed stream to the column. One example of an indirect return of this process stream to the fractionation column would be the utilization of the process stream as a portion of the quench material which is admixed into the effluent of a visbreaking furnace prior to the separation of the visbreaking heater effluent.

The following table presents the calculated amounts of heat transferred in a prior art energy recovery cycle using a preheater and vaporizer to produce hot vapor fed to a turbine and in a comparable cycle employing the subject invention. Both cycles are based on a net column bottoms stream of about 240,000 lb/hr. The values listed in the second column represent the equivalent values for the cycles of the subject invention or the incremental quantities which result in the subject invention. These values are based on the column bottoms stream having a temperature of about 280° F. (138° C.) and the portion of the bottoms stream leaving the vaporizer having a temperature of approximately 260° F. (127° C.). It is further assumed that the portion of the bottoms stream passing through the vaporizer has a flow rate near 927,000 lb/hr. The working fluid used is isobutane and the working fluid receiver is maintained at about 100° F. (38° C.). The efficiency of the turbine is assumed to be 85%. The temperature of the working fluid leaving the vaporizer is set at 250° F. (121° C.).

| | | |
|---|---|---|
| Vaporizer Duty, 10$^6$ BTU/hr | 2.78 | 10.74 |
| Preheater Duty, 10$^6$ BTU/hr | 5.46 | 21.11 |
| Total heat recovered, 10$^6$ BTU/hr | 8.24 | 23.89 |
| Work, KWH/hr | 349. | 1348. |
| Net bottoms to cooler, °F. | 188. | 110. |
| Incremental reboiler load, 10$^6$ BTU/hr | — | 7.96 |
| Incremental BTU/Incremental KWH | — | 7968. |

The information in this table shows that the efficiency of generating electricity, based on incremental BTU's required to produce an incremental kilowatt-hour (KWH), is significantly better than that of a conventional fossil fuel fired electrical utility plant. This efficiency improves with higher temperatures of the working fluid vapor as it leaves the vaporizer, with only about 6,425 BTU/KWH being required for incremental energy inputs with a 260° F. (127° C.) working fluid.

As previously pointed out one or more optional heat sources may be employed in the process to supply an incremental amount of heat beyond the additional heat supplied by the reboiler. These optional heat sources are preferably high temperature fluid streams, such as steam, but could be a fired heating unit receiving a combustible fuel. Potential optional heat sources include reactor effluent streams, cooling media used in controlling a reaction zone temperature including water circulated through fluidized catalytic cracking unit catalyst regeneration zones, fractionation column overhead vapor streams and fractionation column net bottoms streams. Although these optional heat sources can be integrated into the process, their use is not preferred. It is preferred that all incremental heat is supplied by the reboiler of the column and that an external reboiler which receives a portion of the low temperature process stream withdrawn from the vaporizer is employed. The subject process is subject to variation in the location of the reboiler and would be operable with the reboiler being located at a point upstream of the initial division of the bottoms liquid.

The vaporizer removes heat from the bottoms liquid which passes through it to the extent that this bottoms liquid may be 10 to 30 Fahrenheit degrees or more cooler than the bottoms liquid being withdrawn from the column. The amount of heat removed in the vaporizer is dependent on such variables as the temperature and pressure of the working fluid entering the vaporizer, the flow rate of the working fluid through the vaporizer, and the flow rate of the additional portion of the bottoms liquid which flows through the vaporizer. Assuming a constant reboiler operation, any one or more than one of these variables may be adjusted to control the net heat input into the bottom of the fractionation column. This presents a column bottoms control system option in which the reboiler is operated at a constant net heat input (fuel supply) in excess of that required to properly operate the column and the rate of heat removal in the vaporizer is varied to maintain stable operations of the column at the desired net heat input and vapor generation rate. Although this control mode is believed entirely workable it is not preferred.

I claim as my invention:

1. A process for vaporizing a working fluid which comprises the steps of:
   (a) heating a liquid-phase stream of the working fluid in a first indirect heat exchange means wherein less than five mole percent of the working fluid is vaporized by heat exchange against the net bottoms stream of a fractionation column;
   (b) vaporizing at least a portion of the working fluid stream in a second indirect heat exchange means by heat exchange against a high temperature first process stream comprising the net bottoms stream of the fractionation column and an additional amount of the total bottoms stream of the fractionation column and thereby forming a low temperature second process stream.

2. The process of claim 1 further characterized in that a first portion of the second process stream is passed into the fractionation column via a reboiler and a second portion of the second process stream is withdrawn as said net bottoms stream.

3. The process of claim 1 further characterized in that the high temperature first process stream is formed by dividing the total bottoms stream of the fractionation column into the first process stream and a high temperature recycle stream which is passed into the reboiler of the fractionation column.

4. The process of claim 3 further characterized in that a first portion of the second process stream is passed into the reboiler of the fractionation column.

5. A process for generating electrical power which comprises vaporizing a working fluid according to the steps of claim 1 and then depressurizing the vaporized working fluid in a turbine connected to an electrical generator, condensing the thus-depressurized working fluid vapor, and recycling the resultant liquid-phase working fluid to the first indirect heat exchange means.

6. The process of claim 5 further characterized in that the working fluid is water.

7. The process of claim 5 further characterized in that the working fluid comprises a hydrocarbon.

8. An energy conversion process for use in conjunction with a fractionation column which comprises the steps of:

(a) dividing a bottoms liquid stream withdrawn from a fractionation column into a first portion and a second portion;

(b) cooling the second portion of the bottoms stream by passage through a first indirect heat exchange means wherein a working fluid is vaporized;

(c) dividing the second portion of the bottoms stream into a third portion and a fourth portion;

(d) cooling the fourth portion of the bottoms stream by passage through a second indirect heat exchange means wherein the working fluid is heated;

(e) withdrawing the fourth portion of the bottoms stream as the net bottoms stream;

(f) returning the first and the third portions of the bottoms stream to the fractionation column; and, (g) depressurizing vapor-phase working fluid produced in the first indirect heat exchange means in a turbine and thereby recovering useful energy from the vapor-phase working fluid.

9. The process of claim 8 further characterized in that the first and the third portions of the bottoms stream are passed through a reboiler means before being returned to the fractionation column.

10. The process of claim 8 further characterized in that only a first portion of the working fluid which is heated in the second indirect heat exchange means is passed into the first indirect heat exchange means, and in that a second portion of the working fluid which is heated in the second indirect heat exchange means is vaporized in a third indirect heat exchange means to thereby produce vapor-phase working fluid which is depressurized in the turbine.

11. The process of claim 8 further characterized in that the second portion of the bottoms stream is heated by indirect heat exchange before being passed into the first indirect heat exchange means.

12. The process of claim 8 further characterized in that the working fluid is water.

* * * * *